United States Patent [19]

Denaro

[11] 4,094,071
[45] June 13, 1978

[54] ADJUSTABLE TEMPLATE FOR TAPERED AIRFOIL RIB PROFILES

[76] Inventor: James J. Denaro, 543 Bedford St., Concord, Mass. 01742

[21] Appl. No.: 740,869

[22] Filed: Nov. 11, 1976

[51] Int. Cl.² .......................... B41K 1/32; G01B 3/14
[52] U.S. Cl. ............................... 33/174 B; 33/174 G; 35/26
[58] Field of Search ............. 33/174 B, 174 G, 174 C, 33/177; 35/26, 27

[56] References Cited

U.S. PATENT DOCUMENTS

| | | | |
|---|---|---|---|
| 2,435,516 | 2/1948 | Samson | 33/174 B |
| 2,702,944 | 3/1955 | Lane et al. | 33/174 B |
| 3,007,247 | 11/1961 | Boehm | 33/174 B |
| 3,483,628 | 12/1969 | Newman | 33/174 G |
| 3,832,785 | 9/1974 | Miller | 33/174 G |

FOREIGN PATENT DOCUMENTS 883,508   7/1953   Germany ........................... 33/174 B Primary Examiner—Richard E. Aegerter
Assistant Examiner—Richard R. Stearns
Attorney, Agent, or Firm—David E. Brook

[57] ABSTRACT

An adjustable template that defines the profiles of ribs of a tapered airfoil, such as an aerodynamic wing, includes two templates which are movable with respect to each other, one for defining the top portion of a rib profile and the other for defining the bottom portion of the rib profile, the two templates being held together in juxtaposition to each other so that the spacing between the two templates in a direction perpendicular to the chord of the rib profile is readily variable and so the successive rib profiles of a given tapered airfoil are defined by the templates by successive adjustments of the position of one template with respect to the other.

9 Claims, 22 Drawing Figures

CLARK-Y-AIRFOIL

ADJUSTABLE TEMPLATE FOR TAPERED AIRFOIL RIB PROFILES

BACKGROUND OF THE INVENTION

This invention relates to templates for defining the profiles of ribs of an airfoil.

The shape of an airfoil depends on several controlling dimensions and the number of possible variations of these dimensions is extremely great. A number of particular profiles have been proposed, experimentally tested and built into airplane wings and other aircraft surfaces. These are numerous and attempts have been made to systematic classification of them. One system of classification by the National Advisory Commissioner for Aviation (NACA) is a 4-digit system of airfoil classification that describes (1) the maximum camber of the mean line, (2) its position on the chord, (3) and (4) the maximum thickness. Thus, the NACA 4312 airfoil has a maximum mean camber of 4% of the chord at a position 0.3 of the chord from the leading edge and a maximum thickness $t$, of 12% of the chord. For some tapered airfoils, many or all of the rib profiles are the same airfoil classification. That is, they are all defined by the same 4-digit NACA airfoil numbers, but they differ in size. This is the case for the airfoils for a model or small scale aircraft.

Heretofore, the rib profile for a given tapered wing with a given airfoil classification (such as a NACA 4-digit airfoil) have been laborously drawn and scaled from a profile of the particular airfoil such as NACA 4312 of unit length, the unit length being 100%. While this laborous design is acceptable in the layout of full-scale aircraft, it is usually burdensome for the model airplane designer.

SUMMARY OF THE INVENTION

It is an object of the present invention to provide apparatus for defining the profile of ribs of an airfoil.

It is another object to provide adjustable apparatus for defining the profiles of the successive ribs of a tapered airfoil which defines the successive ribs by successive adjustments of the apparatus, thereby aiding in the design of the rib profiles of the tapered airfoil.

It is a further object, in conjunction with the above, to provide such adjustable apparatus that can be laid flat on drawing paper and provides drawing edges adjacent to the paper as guides for drawing the profiles of ribs.

It is a further object, in conjunction with the above, to provide such adjustable apparatus for drawing profiles of ribs including adjustable drawing edges that define the leading and/or trailing edges of the airfoil.

It is another object to provide an adjustable drawing instrument enabling a designer by successive adjustments of the instrument to draw the profiles of successive ribs of a tapered airfoil such as a wing.

The common feature of all embodiments of the present invention described herein is two separate templates that define the top and bottom portions, respectively, of an airfoil rib profile, held so that one template can be moved with respect to the other to define the profiles of ribs of different chord length depending upon the spacing between the two templates in a direction perpendicular to the chord.

The two templates are moved, one with respect to the other either by sliding one or both of the templates along a straight track or by pivoting one of the templates with respect to the other at a pivot point at an extreme end of both templates. In some embodiments, one or both of the templates can be readily changed and so the airfoil classification is readily changed.

These and other objects and features of the present invention are apparent and are more fully understood by reference to the description of the embodiment which follows and the accompanying drawings.

DESCRIPTION OF THE EMBODIMENTS OF THE INVENTION

FIGS. 1 through 8 illustrate the assembly and parts of an embodiment of the present invention wherein one of the airfoil templates has attached on each side of the template, herein called the lead side and the trail side, a track along which the other templates slide and have leading and trailing edge slides that position leading and trailing edge contours so that these contours and the top and bottom contours of the top and bottom templates completely define the profile of an airfoil rib. All parts of the embodiment illustrated by FIGS. 1 through 8 can be cut from sheet stock, such as a sheet of rigid polyvinyl chloride (PVC) fastened together with an adhesive.

The embodiment illustrated by FIGS. 9 through 12 is similar inasmuch as it includes a track fixed to one of the templates along which the other templates slide and leading and trailing edge slides provide leading and trailing edge contours so that all contours can be positioned to define the profile of an airfoil rib. The tracks in this embodiment are provided by rigid rods carried by the bottom emplate and the slides for both the template and the leading and trailing edges include bores that ride on the rods.

The first embodiment illustrated by FIGS. 1 through 8 and the second embodiment, illustrated by FIGS. 9 through 12, can be used to draw symmetrical and non-symmetrical profiles of airfoil ribs. Since the tracks are fixed to the bottom template, the contour defined by the bottom template, is fixed and is used with interchangeable top contour templates. Hence, the utility of these embodiments is enhanced when each is included with a supply of different top templates that are interchangeable. Either of these embodiments may be used to draw the different sizes of a particular airfoil classification and the classification can be changed by changing the top template.

FIRST EMBODIMENT

Figure 1:
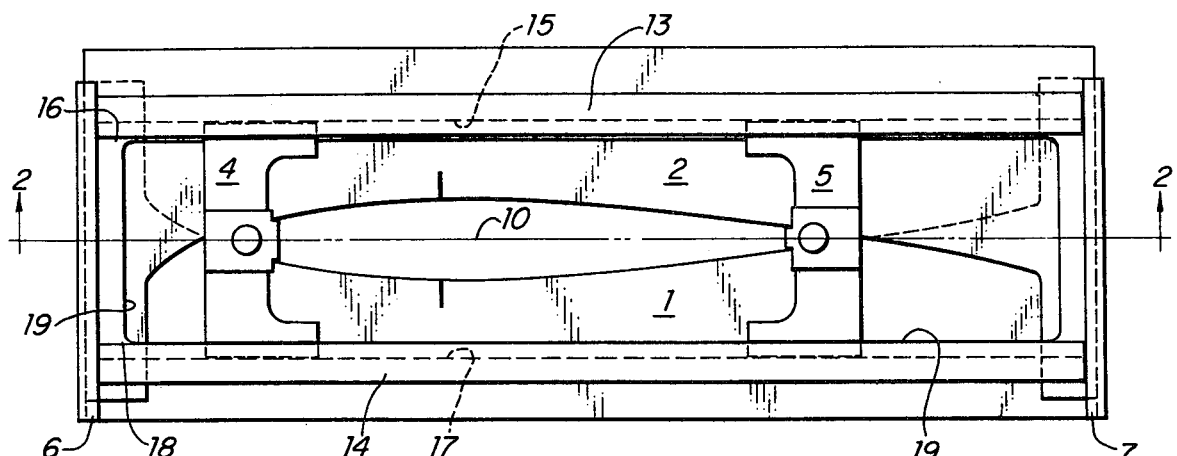
FIG. 1 is a plan view of an embodiment wherein one template slides with respect to the other on a track fixed to the other and a second track is provided carrying leading and trailing edge templates that slide on the second track parallel to the airfoil chord.
Figure 2:
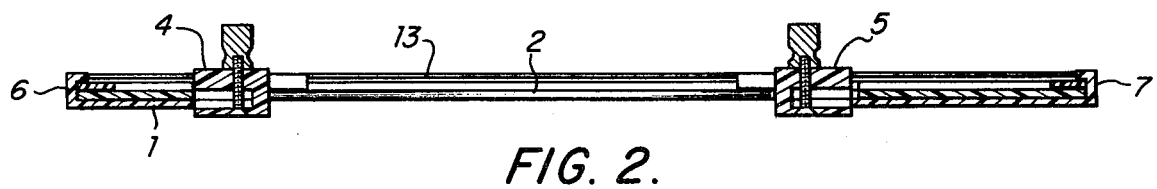
FIG. 2 is a cross section view of the apparatus in FIG. 1.
Figure 3:
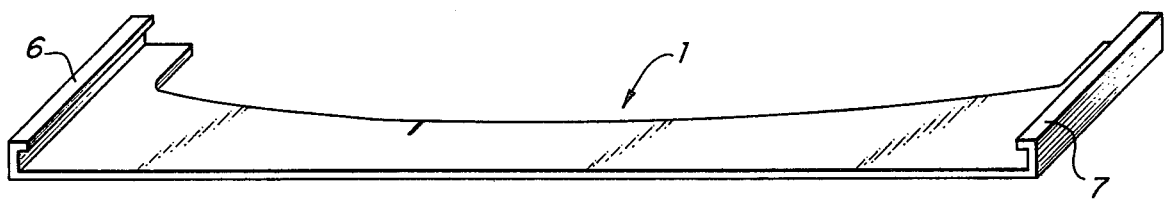
FIGS. 3 and 4 are views of the two templates.
Figure 4:
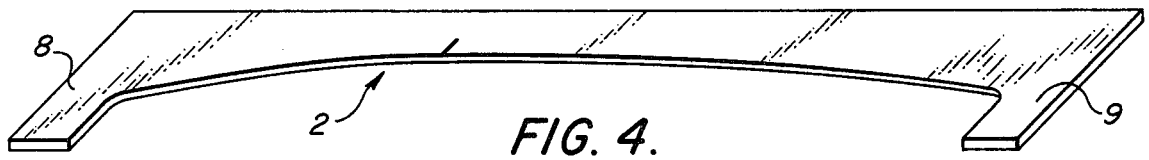
Figure 5:
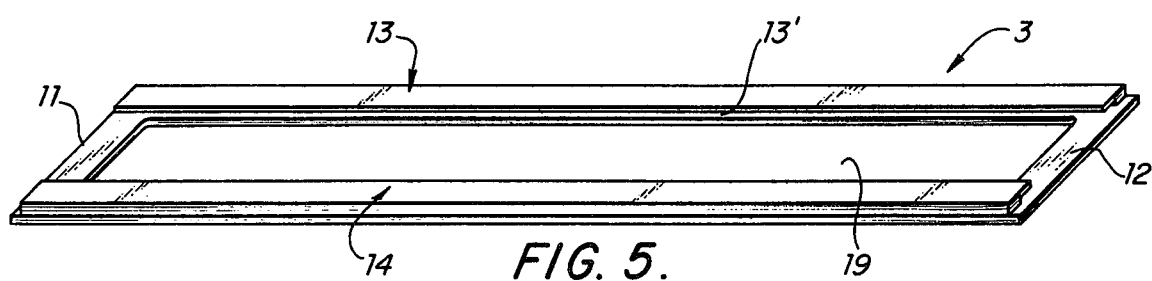
FIG. 5 shows the track for carrying the leading and trailing edge templates.
Figure 6:
FIG. 6 is an end view of that track.

The bottom template 1 and the top template 2 are illustrated by FIGS. 3 and 4, respectively. These templates are assembled with the frame 3 illustrated by FIGS. 5 and 6 and the templates and frame are assembled with the leading and trailing edge slide assemblies shown by FIGS. 7 and 8, respectively. The assembly is illustrated by FIGS. 1 and 2.

Tracks 6 and 7 at the leading edge side and trailing edge side, respectively, of the bottom template accommodate and hold the top template 2 and the frame 3 in, more or less, sandwich relationship, as illustrated by the cross section view of the assembly shown in FIG. 2. For this purpose, the top template 2 includes a leading edge slide 8 and a trailing edge slide 9 and the frame 3 includes a leading edge slide 11 and a trailing edge slide 12.

The frame 3 also includes top and bottom tracks 13 and 14 for the leading and trailing edge slide assemblies 4 and 5. These tracks may be symmetrical and so they may be mere images of each other with respect to the center line 10 and each defines a groove in which the slide assemblies slideably fit. For example, the top track 13 includes a back strip 15 and a bottom strip 16 and the bottom track 14 includes a back strip 17 and a bottom strip 18. These strips are fixedly attached to the frame 3 and define the top and bottom track grooves 13 and 14 just above and adjacent to the window 19 in the frame.

Figure 7:
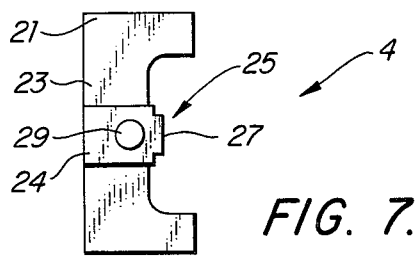
FIGS. 7 and 8 show the leading and trailing edge template assemblies that slide on the track.
Figure 8:
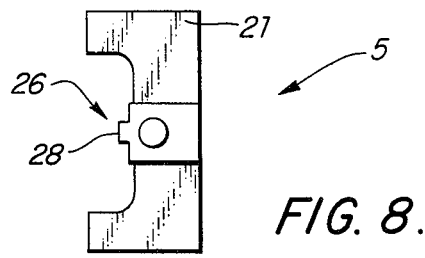

The leading and trailing edge slide assemblies 4 and 5 may be mirror images of each other as shown by FIGS. 7 and 8 except for the leading and trailing edge wedges that are carried by these assemblies. For example, each may include a slide 21 the extreme edges of which fit the grooves 13' and 14' along the window edges of the frame 3 and are connected by a track 23 for the wedge slide 24. The wedge slide has fixed to the inside thereof the leading or trailing edge wedge. These wedges are the leading edge wedge 25 and the trailing edge wedge 26. The one provides the leading edge contour 27 and the other provides the trailing edge contour 28. The wedge slide, such as 24, can be positioned along the track 23 and locked in position by the thumbscrew 29. As shown in FIG. 2, the wedges 25 and 26 extend from their slides to the bottom of the template 1.

The assembled apparatus of this embodiment may be used to draw the successive rib profiles of a tapered airfoil, all profiles having the same airfoil classification. For example, the rib profiles which are successively larger are defined by the apparatus by moving the leading and trailing edge slide assemblies apart. This action forces the top template 2 to slide away from the bottom template 1, all the while maintaining the same airfoil classification profile. The draftsman positions the apparatus with the axis 10 coincident with the chords of successive ribs along the tapered airfoil and then adjusts the slides 4 and 5 to bracket the chord length at each successive rib position to define the complete rib profile including leading and trailing edges at that position.

SECOND EMBODIMENT

The Second Embodiment illustrated by FIGS. 9 through 12 has very much the same versatility as the First Embodiment and is used in much the same way. It includes a bottom template 31, a top template 32, leading and trailing edge slide assemblies 34 and 35, top template tracks 36 and 37 and a track 33 for the slide assemblies 34 and 35. Here, the tracks are defined by rods and the slides are defined by bores that slide on the rods.

Figure 9:
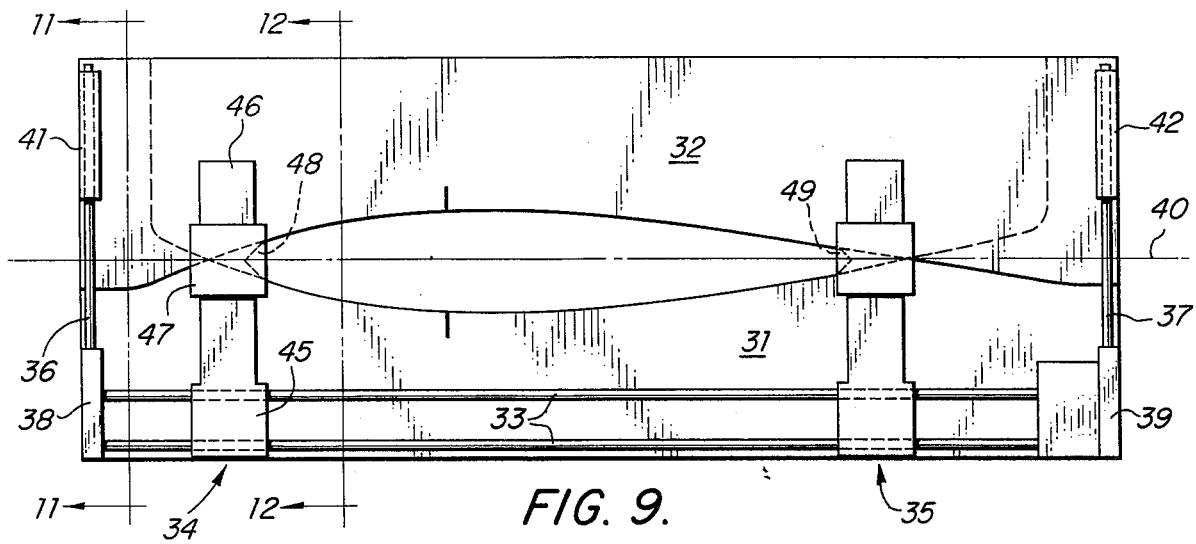
FIG. 9 is a plan view of another embodiment wherein one of the templates carries a track along which the other template slides.
Figure 10:
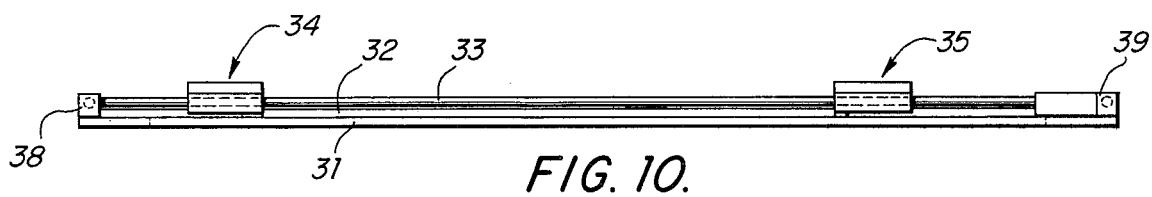
FIG. 10 is an edge view of an apparatus in FIG. 9.
Figure 11:
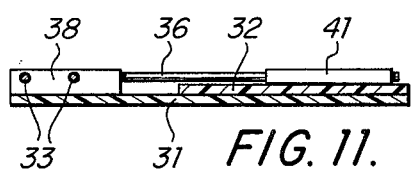
FIGS. 11 and 12 are cross section views of the apparatus in FIG. 9, taken as shown.
Figure 12:
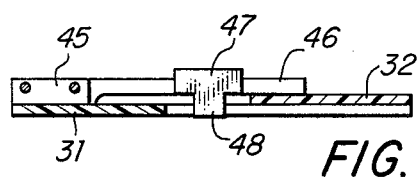

Lead side and trail side blocks 38 and 39 fixed to the bottom template 31 carry all of the rods and hold them rigidly. The rods 33 for the slide assemblies 34 and 35 are suspended between the blocks 38 and 39 and the rods 36 and 37 that carry the top template 32 are suspended from blocks 38 and 39, respectively. The top template slides 41 and 42 at the leading and trailing edges thereof are blocks fixed to the top template and bored to accommodate the rods 36 and 37. FIG. 11 is a cross section view taken as shown in FIG. 9 illustrating the template track and slides at the leading edge end of the apparatus.

The leading and trailing edge slide assemblies 34 and 35 may be mirror images of each other except for the leading and trailing edge wedges 48 and 49 carried by these assemblies. An edge view of assembly 34 is illustrated by the cross section view of FIG. 12 which is taken as illustrated in FIG. 9. Each of these slide assemblies includes a slide block, such as 45, which is bored to slideably fit the rods 33 and, extending from the block is a track arm 46 that carries the wedge holder 47. The wedge is attached to the wedge holder and provides the leading or trailing edge contours 48 or 49.

In operation, the Second Embodiment is used in much the same way as the First Embodiment. The apparatus is laid flat upon drawing paper with the axis 40 coincident with the chord of the particular rib section of a tapered wing that is to be drawn and the leading and trailing edge slide assemblies 34 and 35 are simultaneously spread to equal the chord length of the particular rib to be formed.

THIRD EMBODIMENT

Figure 13:
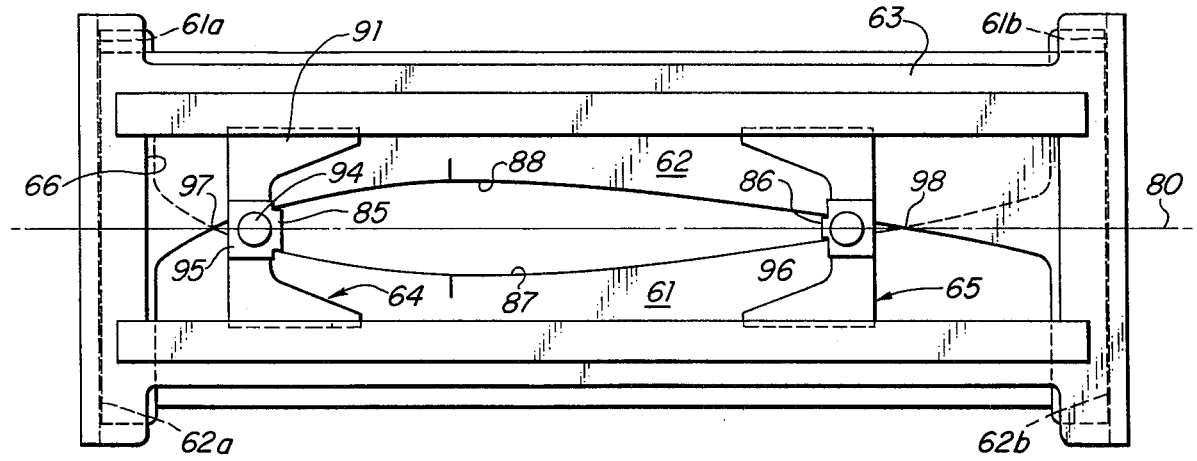
FIG. 13 is a plan view of another embodiment wherein both templates are changeable.
Figure 14:
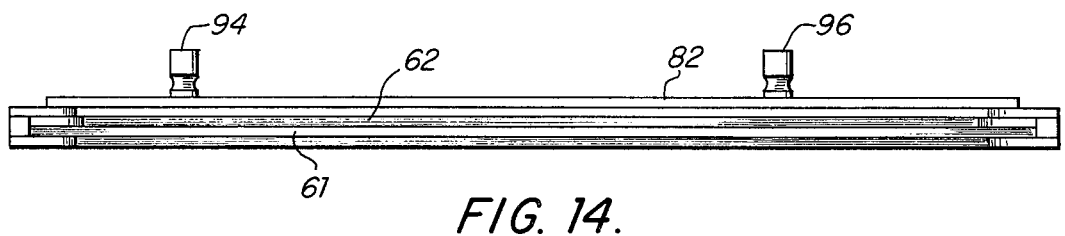
FIG. 14 is a front view of the apparatus of FIG. 13.
Figure 15:
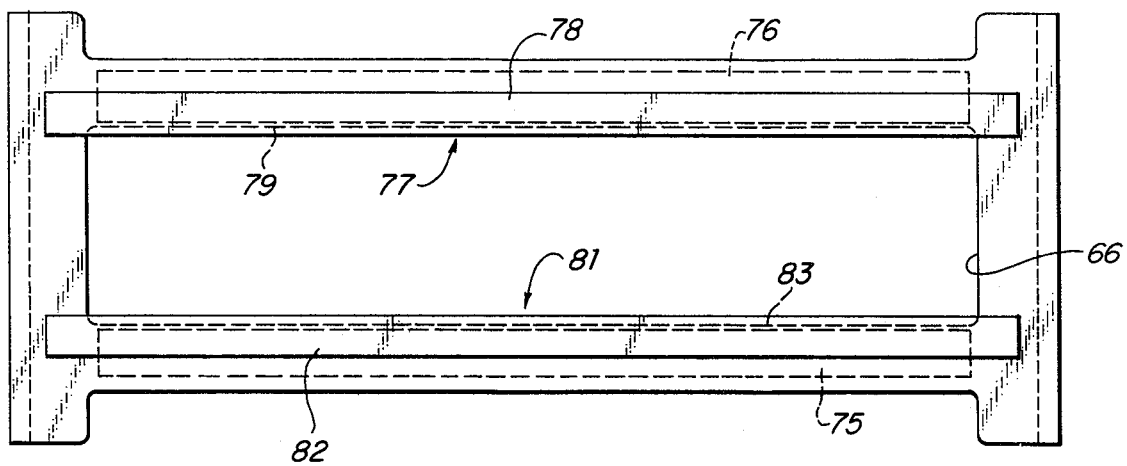
FIG. 15 is a plan view of the template holder of the embodiment in FIG. 13.
Figure 16:
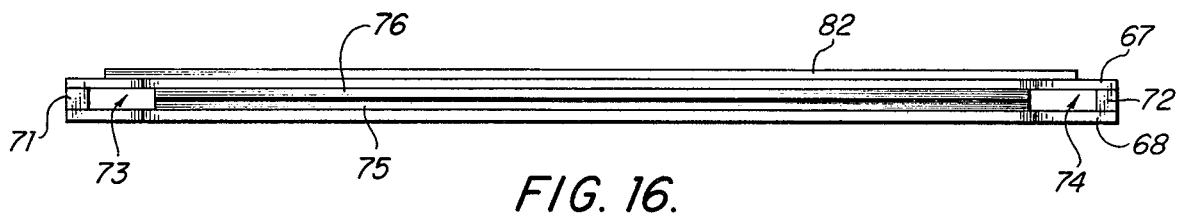
FIG. 16 is a front view of the template holder.
Figure 17:
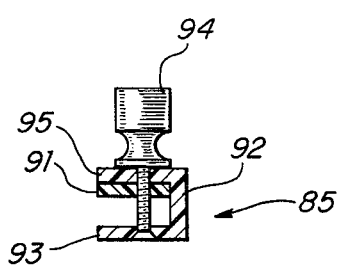
FIGS. 17 and 18 are cross section views of the leading edge slide assembly of the embodiment in FIG. 13; and, FIGS. 19, 20, 21 and 22 illustrate the construction of three embodiments wherein the templates are pivotally attached at the extreme of one end thereof (the leading edge end).
Figure 18:
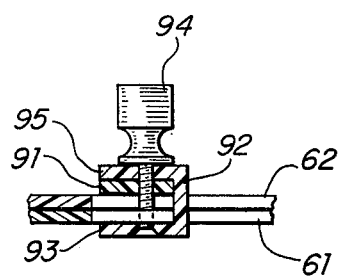

The Third Embodiment of the present invention is illustrated by FIGS. 13 through 16. FIGS. 13 and 14 show plan and front views of the complete assembly of this apparatus and FIGS. 15 and 16 are plan and front views of the track housing or frame. The leading and trailing edge slide assemblies in this embodiment are, as in the other embodiments, substantially mirror images of each other except for the leading and trailing edge contours thereof. Details of the leading edge slide assembly are illustrated by FIGS. 17 and 18. These slide assemblies are constructed and function nearly identical to leading and trailing edge slide assemblies 4 and 5 of the First Embodiment. More particularly, the leading and trailing edge contours thereof are not necessarily moveable with respect to the assembly; and these assemblies are each capable of locking the templates and the assembly together by turning locking screws.

The assembled apparatus includes bottom and top templates 61 and 62, a frame 63 that provides the template tracks and leading and trailing edge slide tracks and the slide assemblies 64 and 65 for the leading and trailing edges. The templates 61 and 62 are each flat pieces of similar shape. Each provides a template contour and each has edge portions at the leading and trailing edges thereof that define slides that fit and slide in tracks in the housing 63. Either of these templates can be changed in the assembly and, in fact, the bottom and top templates are interchangeable with each other. The frame or housing 63 holds both the templates and the slide assemblies and includes a window 66 in which the airfoil rib profile is defined.

The frame 63 includes top and bottom plates 67 and 68, spaced apart and fastened together at their edges by track spacing blocks 71 and 72. Each of the plates 67 and 68 is generally H-shaped, and they may be identical to each other, each with a window such as 66 spanning from the leading edge template slide track 73 to the trailing edge template slide track 74. These slide tracks are defined by the plates 67 and 68, blocks 71 and 72 and by the bottom and top template spacer strips 75 and 76 located as shown in FIGS. 15 and 16. These strips fill the spaces caused by the overlapping templates 61 and 62. The top template strip 76 provides part of the bottom track for the leading and trailing edge slide assemblies. The top track for these slide assemblies, denoted 77, is a groove defined by the top track strip 78, the edge 79 of window 66 and the top plate 67 and the top template 62. The other track for the slide assemblies, the bottom track 81, is defined by the bottom strip 82 attached to the top plate 67, the bottom edge 83 of window 66 in the top plate and the bottom template spacer 75. The bottom edge of the leading and trailing edge slide assemblies 64 and 65 slide on these top and bottom grooves.

The slide assemblies 64 and 65 may be essentially mirror images of each other except for the leading and trailing edge contours 85 and 86, respectively, thereof. These contours define the leading and trailing edges of the rib profile and combined with the bottom and top template contours 87 and 88 define the complete profile of the airfoil rib section. In this embodiment, since both the bottom and the top template slide in the frame, the leading and trailing edge contours need not be positionable in the direction the template slides. Hence, the contours and the wedges that they are part of may be fixed to the slide assembly.

A cross section view of the leading edge slide assembly 64 taken as shown in FIG. 13, the slide assembly being removed from the apparatus, is illustrated by FIG. 17 and the same view with the slide assembly assembled with the apparatus is illustrated by FIG. 18. The assembly includes a slide 91 the extreme edges of which fit in the top and bottom tracks 77 and 81, respectively, a leading edge wedge 92 that may be fixedly attached to 91, a gripping plate 93 that extends below 91 from the bottom end of the wedge and a thumb screw 94 that threadably connects to the tripping plate 93 and shoulders against corresponding plate 95 attached to the top of 91. The two plates 93 and 95 are in substantial registration and when the leading edge wedge 92 is in position and the thumb screw 94 is tightened, the leading edge slide assembly 64 and the bottom and top templates 61 and 62 are squeezed together between the plates 93 and 95 and so the positions of the three are fixed. The trailing edge slide assembly 65 functions in the same way and includes a thumb screw which when tightened also grips the assembly and templates squeezing them together and holding all in place.

The apparatus is assembled most easily by first placing the leading and trailing edge slide assemblies 64 and 65 in position with their edges in the top and bottom tracks, even though the top track is not fully defined until the top template is assembled. The bottom track, however, is fully defined and is sufficient to hold the slide assemblies in place. Next, the bottom template 61 is inserted from the bottom end of the frame with the sliding edges thereof, 61a and 61b, in the tracks 73 and 74, respectively. Then the top template is inserted from the top end of the frame with the sliding edges 62a and 62b of that template in the tracks 73 and 74 and on top of the bottom template. At this point the assembly is completed and the apparatus is ready for use.

When used to draw the rib profiles of successive sections of an airfoil, such as a tapered airfoil, the center line 80 of the apparatus fixed to the frame 63 is aligned coincident with the chord of the rib. Then the slide assemblies 64 and 65 are positioned to place the leading and trailing edge contours 85 and 86 at the desired positions along the rib chord. Then the templates are pushed together in the frame until they abut the wedges and this completes the profile of the rib. Clearly, the sequence in use may be changed. For example, at the first step, both slide assemblies may be moved toward the center, the templates closed are opened to place the leading and trailing edge points of intersection 97 and 98 at the points of intersection of the rib chord with the leading and trailing edges of the tapered airfoil, and, then, the slide assemblies are moved apart until the edge of each abuts the template contours. Then the thumb screws are turned to lock all moving parts together and the profile of the rib can be drawn.

Clearly, with this embodiment either or both of the templates can be changed and they can be interchanged. A library of different templates can be maintained to provide an extremely versatile apparatus for drawing a great variety of classifications of airfoil sections in relatively large to relatively small size. An advantage achieved with this apparatus by comparision with the apparatus of the First and Second Embodiment is that for each rib section the frame 63 that carries all the adjustable parts can remain at a fixed position while the contour of the rib is defined by adjusting the moving parts.

FOURTH EMBODIMENT

Figure 19:
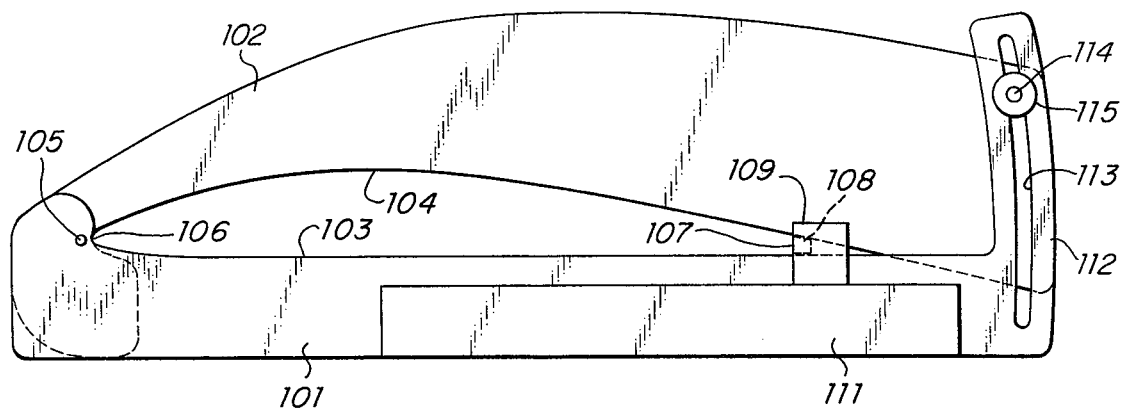
Figure 20:
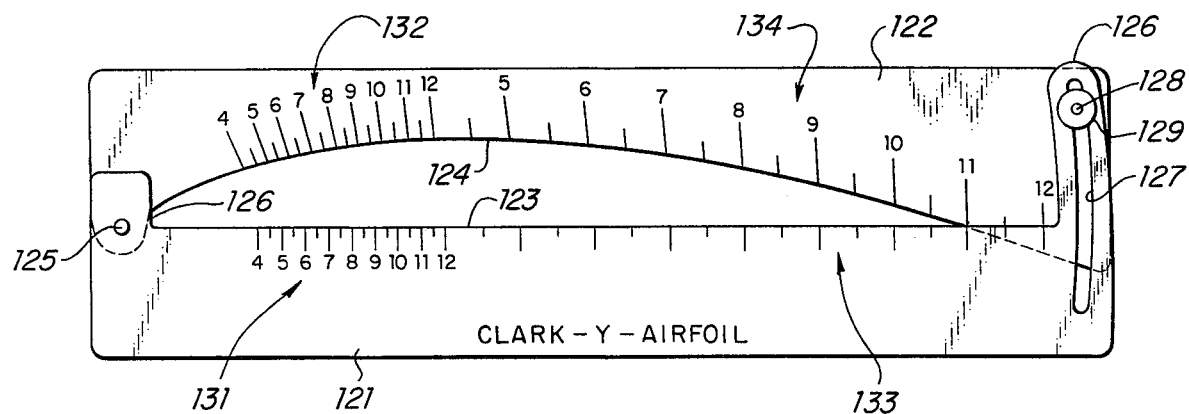
Figures 21, 22:
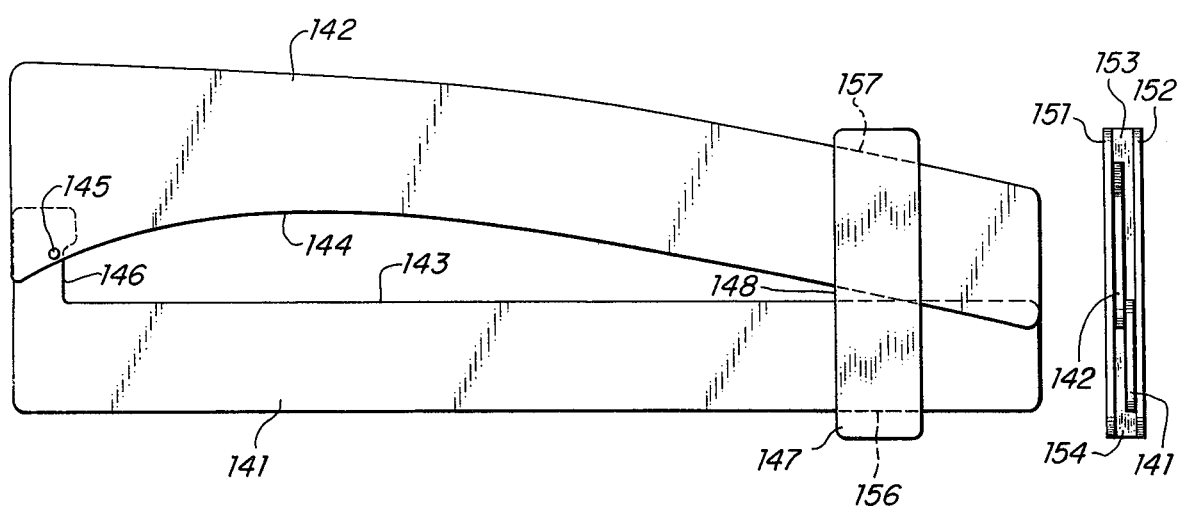

FIGS. 19, 20 and 21 are plan views of each of three different variations of the Fourth Embodiment. These all feature two templates, the bottom template and the top template, which are pivotally connected together at the leading edge end. Each defines a given characteristic airfoil that may be symmetrical or nonsymmetrical, depending on the contour of the top and bottom templates, and the size of the airfoil is varied by pivoting one template with respect to the other to define a small or large rib section of the particular characteristic airfoil.

In FIG. 19, the bottom template 101 and the top template 102 provide the bottom and top airfoil contours 103 and 104, respectively. The templates connect at the leading edge ends at a pivot axle 105. The leading edge is defined by the leading edge contour 106 that is part of the bottom template. The trailing edge contour 107 is defined by a wedge 108 carried on a slide 109 that slides on a track 111 attached to the bottom template 101. A guidearm 112 extending from the bottom template includes a guideslot 113 engaged by a pin 114 attached to the top template and a thumb nut may be provided threadably attachable to the pin for locking the trailing edge end of the templates together. In use, this apparatus may be laid on drawing paper where the rib profile is to be drawn and then one of the templates pivoted with respect to the other to define the rib profile of proper length. Then the thumb nut 115 is tightened to lock the templates, the trailing edge wedge is moved to the position shown and the rib profile is drawn.

In FIG. 20, the bottom and top templates 121 and 122 providing contours 123 and 124, respectively, are pivotably connected at axle 125. The leading edge contour 126 is defined by the bottom template and beyond the trailing edge the templates are locked together at the desired position by the arrangement of arm 126 including slot 127 in which slides pin 128 carried by the top template and thumb nut 129.

Scale 131 and 132 along the contours 123 and 124 are provided to identify the spar reference location when the templates are pivoted to close corresponding scale lines of scales 133 and 134 on the bottom and top templates, respectively. For example, at the position of the templates shown by FIG. 20 the line numbered 11 in scale 134 meets the corresponding line on scale 133 and so at this position the spar location is a line from number 11 of scale 132 to number 11 of scale 131. The particular airfoil characteristic is denoted the Clark Y.

In FIG. 21, the bottom template 141 providing contour 143 and the top plate 142, providing contour 144 are pivotably attached by axle 145 and the leading edge 146 is on the bottom template. At the trailing edge of the apparatus, the slide 147 encloses the ends of both templates and slides along both and defines the trailing edge contour 148. The portions of the two templates which are enclosed by the slide are of necessity each of uniform width so that the slide can slide along each without binding. An end view of this apparatus reveals the construction of the slide which may be made in four parts, a top plate 151, a bottom plate 152 in registration with the top plate and between the two plates, the top template spacer 153 and the bottom template spacer 154 combine with the two plates to define slots into which the template slideably fits. As also shown, these defined slots when viewed in FIG. 21 are outlined by the broken lines crossing the slide 147. In use, the templates define a given characteristic airfoil and by sliding the slide along the templates to open or close the templates the characteristic airfoil is outlined in different sizes.

The apparatus represented by embodiments of the present invention represent the best known use of the invention and that use is primarily for drawing or designing the profiles of ribs at specific sections of an airfoil. An advantage of the present invention gained by all embodiments described herein, is that drawing rib profiles of different sizes of a given airfoil is facilitated. It is suggested that the same techniques incorporated in the embodiments of the present invention could be employed to draw ribs of other bodies besides airfoils. For example, these techniques could be used to draw ribs of a fuselage or the ribs of a boat or a ship. It is conceded that the techniques described have limitations as to precision and accuracy and so they may not have direct application for drawing profiles of full size devices, however, this does not preclude adaptation of these features to design or draw rib profiles of full size craft and vessels.

The scope of the present invention is set forth by the appended claims.

What we claim is:

1. An adjustable template for defining a rib profile of an airfoil comprising in combination:
   a. a frame;
   b. a first template defining an upper rib profile and a second template defining a lower rib profile, said first and second templates being slideably engaged within said frame so that each is independently slideable in a direction transverse to the chord of said rib to thereby define the rib profile; and,
   c. means for defining an edge of said rib profile, said means comprising a slide assembly engaged within the frame and slideable along the chord of said rib profile.

2. An adjustable template of claim 1 wherein said means for defining an edge includes means for defining both the leading edge and the trailing edge which comprises leading and trailing edge slide assemblies, respectively, which are also slideably engaged within the frame so that each slide assembly is slideable in a direction along the chord of said rib profile.

3. An adjustable template for defining rib profiles of a tapered airfoil, comprising:
   a. a first template defining an upper rib profile;
   b. a second template defining a lower rib profile;
   c. means for holding said first template and said second template in juxtaposition to each other to define a rib profile, said means for holding allowing at least one of said templates to be moved in a direction transverse to the chord of said rib profile to thereby vary the spacing between said upper rib profile and said lower rib profile; and,
   d. means for defining the leading edge of said rib profile, said means for defining being slideable on said means for holding along the chord of said rib.

4. An adjustable template of claim 3 additionally including means for defining the trailing edge of said rib profile, said means for defining the trailing edge being slideable on said means for holding along the chord of said rib.

5. An adjustable template of claim 4 additionally including means for locking said first and said second templates, said means defining the leading edge and said means defining the trailing edge in fixed positions with respect to each other.

6. An adjustable template of claim 4 wherein said means for holding comprises a frame member having said first template and said second template slideably engaged therein.

7. An adjustable template of claim 6 wherein the first template and the second template are each independently slideably mounted within said frame whereby each template can be moved in a direction transverse to the chord of said rib profile.

8. An adjustable template of claim 7 additionally including means for locking said first and said second templates, said means defining the leading edge and said means defining the trailing edge in fixed positions with respect to each other.

9. An adjustable template for defining rib profiles of a tapered airfoil, comprising:
   a. a first template defining an upper rib profile;
   b. a second template defining a lower rib profile;
   c. means for holding said first template and said second template in juxtaposition to each other to define a rib profile, said means for holding comprising a hinged connection allowing the first template to pivot with respect to the second template; and,
   d. means for defining a trailing edge for said rib profile, said means comprising a slide member slidable along at least one of said templates in a direction generally parallel to the chord of said rib profile.

* * * * *